United States Patent
Posthuma et al.

(10) Patent No.: US 6,349,130 B1
(45) Date of Patent: Feb. 19, 2002

(54) METHOD TO PRE-QUALIFY COPPER LOOPS FOR ADSL SERVICE

(75) Inventors: Carl R. Posthuma; Albert J. Sawyer, both of Weaton, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/218,970

(22) Filed: Dec. 22, 1998

(51) Int. Cl.[7] ................................................. H04M 1/24
(52) U.S. Cl. .................. 379/1.04; 379/27.01; 379/29.01
(58) Field of Search ............................... 379/26, 24, 25, 379/6, 29, 27, 1, 5, 1.01, 1.03, 1.04, 10.01, 10.02, 12, 18, 22, 22.02, 22.04, 26.01, 27.01, 27.02, 27.03, 29.01, 29.1

(56) References Cited

U.S. PATENT DOCUMENTS

| | | | | |
|---|---|---|---|---|
| 5,111,497 A | * | 5/1992 | Bliven et al. ................. | 379/27 |
| 5,530,724 A | * | 6/1996 | Abrams et al. ............. | 379/399 |
| 5,799,060 A | * | 8/1998 | Kennedy et al. .............. | 379/29 |
| 5,881,130 A | * | 3/1999 | Zhang ........................... | 379/6 |
| 5,974,115 A | * | 10/1999 | Chan et al. .................... | 379/27 |
| 5,982,851 A | * | 11/1999 | Kennedy et al. .............. | 379/21 |
| 6,002,671 A | * | 12/1999 | Kahkoska et al. ............ | 379/27 |
| 6,014,425 A | * | 1/2000 | Bingel et al. ................. | 379/27 |
| 6,084,946 A | * | 7/2000 | Beierle ......................... | 379/30 |
| 6,091,713 A | * | 7/2000 | Lechleider et al. ........... | 379/27 |

OTHER PUBLICATIONS

Bellcore, Call Processing, Generic Requirements GR–505–Core, Issue 1, Dec., 1997.

* cited by examiner

*Primary Examiner*—Stella Woo
*Assistant Examiner*—Rexford Barnie

(57) ABSTRACT

A method that uses a test system at one end of a communication link to test the communication link for high speed service by coupling the test system to the communication link, placing a telephonic call to telephonic equipment located at an other end of the communication link and testing the communication link with the test system after the call has been terminated at the telephonic equipment.

35 Claims, 2 Drawing Sheets

METHOD TO PRE-QUALIFY COPPER LOOPS FOR ADSL SERVICE

BACKGROUND OF INVENTION

This invention relates to high speed services, and more particularly, to methods for testing communication links for high speed services.

XDSL is a digital connection to a location of a customer (a.k.a. user) over standard, single twisted pair, wiring that is already connected to most premises. As a result of the increased transmission capacity of XDSL compared to standard telephone connections, XDSL promises to transmit large data files to the premises of users for computer, video and other large data operation in a fast and efficient manner. There are many different types of XDSL services such as asymmetrical digital subscriber line (ADSL), high bit rate digital subscriber line (HDSL), high bit rate digital subscriber line-2 (HDSL-2), symmetric digital subscriber line (SDSL), very high speed digital subscriber line (VDSL), ADSL-lite, and other similar high speed digital services. Additionally, there are other non-digital high speed transmission techniques.

Unfortunately, some potential user lines lack the capability of supporting a high speed service because of deficiencies in the loop transmission characteristics. As such, service providers offering XDSL or other high speed service to potential users must first determine if the lines of the potential user can support high speed service. Thus, there is a need to perform high speed service tests for potential users.

Service providers (such as telecommunication companies Ameritech, Pacific Telesis, GTE, Southwestern Bell, etc.) that have physical access to the local loops via traditional office metallic test equipment such as mechanized loop testing (MLT) equipment can easily perform these tests. The local loops are the physical wires that run from the customer premises equipment (CPE) of the user to the central office of the service provider. CPE generally relates to any telephonic equipment (telephones, key systems, private branch exchange (PBX), answering machines, etc.) that resides on the premises of the user.

MLT provides computer control of accurate and extensive loop testing functions in the user contact, screening, testing, dispatch and close-out phases of trouble report handling. MLT also provides full diagnostic outputs instead of just pass and fail indications.

As XDSL and other high speed services continue to grow, an ever increasing number of service providers will offer high speed service to potential users. Many of these service providers will not have direct access to any metallic loop testing such as MLT because these service providers do not have physical access to the local loops.

For service providers that do not have access to the local loops the only option available to perform high speed service tests is to perform double ended measurement techniques. Unfortunately, these double ended measurement techniques require the dispatch of test personnel from the service provider, that does not have access to the local loops, to the premises of the potential user. Thus, there is a need to perform a single ended test method that would allow a service provider to perform high speed service tests without dispatching personnel to the premises of a potential user and without requiring access to the local loop via traditional office metallic test equipment.

SUMMARY OF THE INVENTION

The above problems are solved, and a number of technical advances are achieved in the art, by using a time interval between the time that a CPE device terminates a received call and the time that the central office disconnects the call.

In accordance with the invention, a test unit is connected to one end (first end) of a communication link. A call is then made from a communication unit, located at a test facility, at the first end of the communication link to CPE located at a second end of the communication link. The CPE receives the call at the second end of the communication link and then terminates the call. The test unit tests the communication link within a time interval after the CPE terminates the call.

BRIEF DESCRIPTION OF THE DRAWINGS

The foregoing advantageous features of the invention will be described in detail and other advantageous features will be made apparent upon reading the following detailed description that is given with reference to the several figures of the drawings, in which.

DETAILED DESCRIPTION

Figure 1:
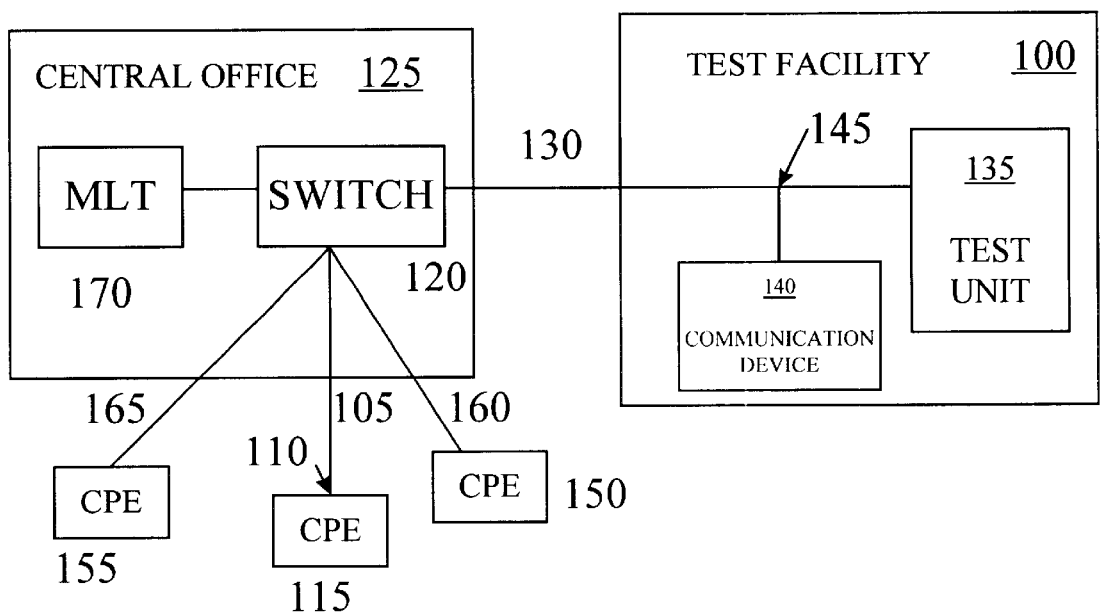
FIG. 1 is a functional block diagram of the implementation of the method for performing the high speed service tests by a test facility.

Referring to FIG. 1, a test facility 100 is shown implementing a high speed service (such as XDSL or a high speed analog service) test for a communication line 105 of a potential user. Communication line 105 is also connected at one end 110 to customer premises equipment (CPE) 115 (CPE generally relates to any telephonic equipment such as telephones, key systems, PBX, answering machines, etc.) of the potential user. FIG. 1 also shows that the communication line 105 is connected to a switch 120 located at a central office 125. The switch 120 is any commercially available telecommunication switch which will allow the central office 125 to communicate to a plurality of CPEs. An example of a switch 125 is a 5ESS telephonic switch produced by Lucent Technologies, Inc.

A second communication line, referred to as a data line 130, is shown to connect the switch 120, at the central office 125, to a test unit 135 and a communication device 140, at a connection point 145 of the data line 130, located at the test facility 100. A communication link is established between the test facility 100 and the CPE 115 via data line 130, communication line 105, and switch 120. The combination of the electrical paths from the connection point 145 of data line 130 to the end 110 of the communication line 105 through the switch 120 establish the communication link. Additionally, the connection point 145 of the data line 130 is herein referred to as the first end 145 of the communication link and the end 110 of the communication line 105 is referred to as the second end 110 of the communication link.

Additional CPEs (150 and 155) are shown connected to the switch 120 through communication lines 160 and 165 respectively. The invention will work equally well for a plurality of CPEs and communication lines without limitation as the switch 120 is enabled to communicate with multiple CPEs.

The communication line 105 is preferably a standard telephone line such as a single twisted pair line. However, it is appreciated that other non-standard telephone lines such as non-twisted pair, multiple twisted pair, coaxial, fiber optic, microwave or millimeter lines may suitably be employed.

The communication line 105 is controlled by a central office 125. A service provider associated with the telephonic central office 125 owns, maintains and controls the communication lines 105, 160, 165 coupled with switch 120. The central office 125 has full access to the communication line 105 and performs metallic loop access testing on the communication line 105.

The central office 125 of FIG. 1 is shown with a mechanized loop testing (MLT) 170 block and the switch 120 block. The MLT 170 block represents the MLT testing units at the central office 125. The MLT units 170 are physically connected to the communication line 105 through the switch 120.

The test facility 100, FIG. 1, is shown to posses the test unit 135 and the communication device 140 connected to the data line 130 via the first end 145 of the communication link. The data line 130 is preferably a T-1 trunk line. A trunk is a communication line between two switching systems such as equipment in the central office 125 and the test facility 100. The T-1 line is preferably a dual twisted pair digital transmission link with a transmission capacity of 1,544,000 bits per second.

Although a T-1 type line may be employed, the data line 130 may selectively be any high speed digital line that is compatible with the central office 125 such as primary rate interface (PRI). PRI is the integrated service digital network (ISDN) equivalent of a T-1 line. Additionally, the data line 130 may selectively also be a whole network or part of network which includes several switches and/or different types of transmission equipment. A non-digital line may also be employed as a data line 130. For an analog type line, the electrical properties inherent in all analog trunks will be employed.

As an example of operation, communication device 140 located at the test facility 100 either initiates or receives a call from the CPE 115. If the user of the CPE 115 wishes to know if the communication line 105 is capable of supporting high speed service then the test facility 100 connects the test unit 135 to the data line 130 and the communication device 140 (either automatically or in response to user interaction) instructs the CPE 115 to terminate the call (such as hanging up a telephone). Once the CPE 115 terminates the call, the test facility 100 begins the high speed testing with the test unit 135.

The high speed service testing preferably takes place within a pre-selected time interval such as a ten second time interval after the CPE 115 terminates the call. In the United States(called telephone lines stay active and connected :or approximately ten seconds after a telephone is hung up (before the switch network at the central office 125 disconnects the call.) The specification for the time interval is described in Bellcore specification GR-505-CORE section 5.4.1.3 R5-22 [214], herein incorporated by reference.

While testing, the test unit 135 propagates electromagnetic energy waves (signals) from the first end 145 to the second end 110 of the communication link. When the waves reach the second end 110 of the communication link the waves are then reflected back to the test unit 135 at the first end 145 of the communication link. Once the reflected waves are received by the test unit 135, the test unit 135 analyzes the reflected waves in relation to the propagated waves and determines the electrical properties of the communication link such as calculating the frequency properties of the loop. The test unit 135 calculates the channel capacity of the communication link divided in either asymmetrical and symmetrical upstream and downstream rates for the communication link. The test unit 135 then records the various electrical properties of the communication link for future use. It is appreciated that the recorded data from the test unit 135 may selectively be stored in a memory unit located either within or external to the test unit 135.

Additionally, if the communication link supports the use of a autocut function, the autocut function is preferably disabled by either the test unit 135 or the central office 125 of FIG. 1. The autocut function is a function that prevents oscillations when the CPE 115 goes on-hook (i.e. the CPE 115 terminates the call).

The recorded data may selectively include the loop length, line load impedance, the presence of loading coils and analog frequency performance. The test unit 135 also records whether the communication link supports a high speed service and the upstream and downstream rates of the communication link both for digital and/or analog transmission. Once this information is recorded the test facility 100 determines if a high speed service may be supported which in a digital case supports XDSL and in an analog case selectively supports one or more of the following: television transmissions, music, voice, multiplexed voice, image and/or video transmission.

An example of the test unit 135 is the Lucent Technologies, Inc. Remote Measurement System—Digital unit (RMS-D), however, other manufactures also produce similar units. These units are preferably digital signal processing (DSP) based and are selectively updated with new firmware to perform multiple tests. While there are several alternatives to measuring and calculating the electrical properties of the communication link the following two example tests selectively provide the test data to the test unit 135.

First, a four wire return loss measurement is selectively used to determine the approximate length of the communication link loop when the CPE 115 is on-hook. The larger the return signal (i.e. lower return loss) the shorter the loop length. The smaller the returned signal (i.e. higher return loss) the longer the loop length.

In the second test, a sweep of the frequency while looking at the returned signals is selectively used to determine the presence of loading coils. If this test indicates the presence of loading coils, the loading coils are selectively removed in a later operation.

If the return loss of the first test is low, the loop is short and supports very high data rates. If the return loss of the first test is high, the loop is long and selectively supports high data rates. A mapping is selectively generated from the return loss results versus the data rates.

The upstream or downstream asymmetric data rates for ADSL, ADSL Lite and VDSL are selectively mapped to the return loss values via correlation between the loop lengths and performance values as given in the XDSL standards. Similarly, the symmetric bit rates for HDSL, HDSL-2 and symmetric VDSL are selectively mapped to return loss values via correlation between loop lengths and the performance values given in the XDSL standards.

Figure 2:
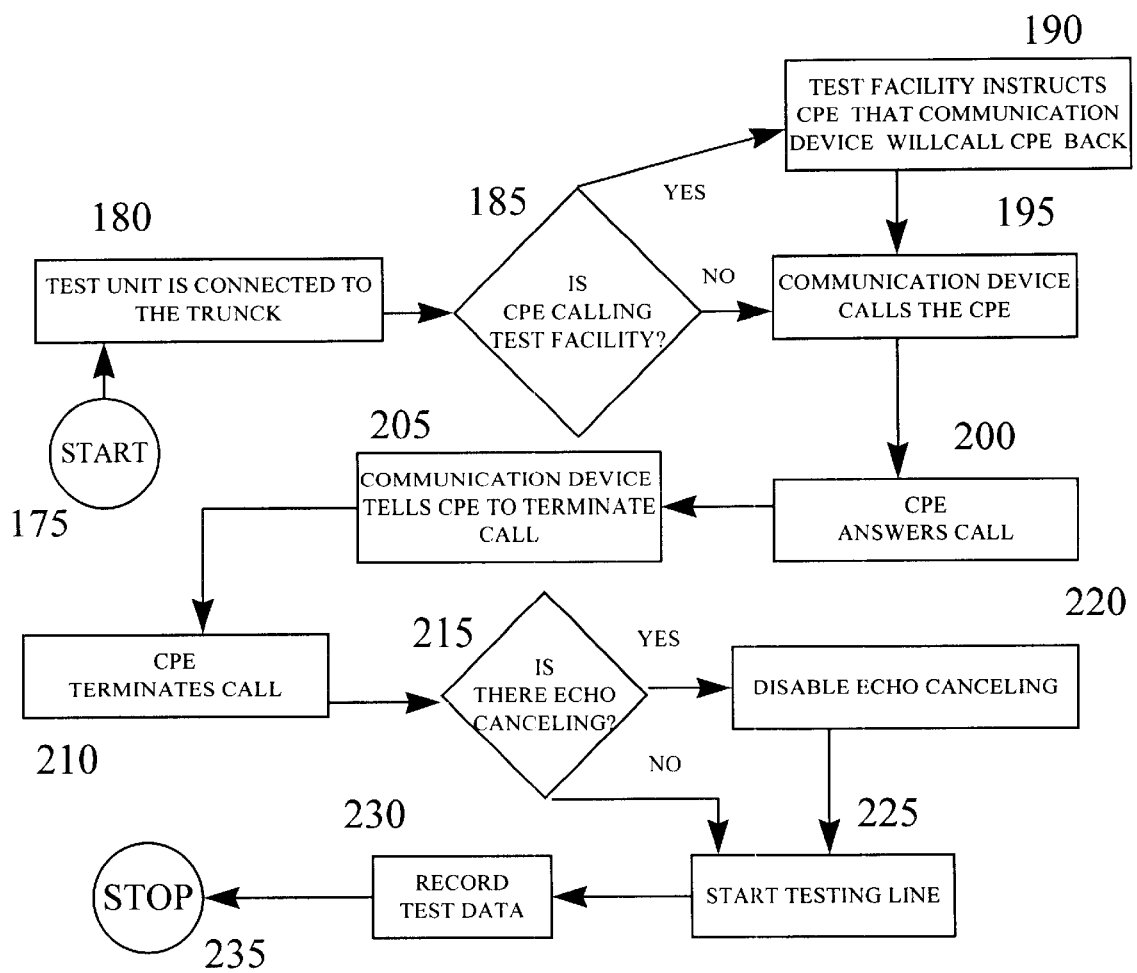
FIG. 2 is a logic flow chart showing the steps of the process performed by the test facility.

Referring now to FIG. 2, a logic flow chart is shown describing the process of testing the communication link. The process starts at step 175. In step 180, the test facility 100 of FIG. 1 connects the test unit 135 to the data line 130 at the first end 145. Next a call is made by either the CPE 115 or the communication device 140. In decision step 185, FIG. 2, if the CPE 115 of FIG. 1 calls the test facility 100, the process continues to step 190. In step 190, FIG. 2, the communication device 140, FIG. 1, instructs the CPE 115 that the communication device 140 will call the CPE 115 back. The process then continues to step 195. If instead, the communication device 140 calls the CPE 115, the process continues directly to step 195.

In step 195, FIG. 2, the communication device 140, FIG. 1, calls the CPE 115 which answers the call in step 200. The communication device 140 then instructs the CPE 115, in step 205, to terminate the call, which the CPE 115 does in step 210. The communication device 140 then determines in decision step 215 if there is echo canceling capabilities on the communication link. If there is echo canceling capabilities on the communication link, decision step 215 then sends the process to step 220 that disables the echo canceling capabilities of the communication link. The process then continues to step 225. In step 225, FIG. 2, the test facility 100, FIG. 1, begins testing the communication link with the test unit 135. If there is no echo canceling on the communication link, the process then continues to step 225, FIG. 2, directly and the test facility 100, FIG. 1, begins testing the communication link with the test unit 135.

In step 230, FIG. 2, the process then records any test data that the test unit 135, FIG. 1, needs in order to determine performance of the communication link. Within this step, the test unit 135 determines whether the communication link is high speed service capable and then, if capable of supporting high speed service, the test unit 135 determines the upstream and downstream rates of the communication link. The process ends at 235.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope.

What is claimed is:

1. A method for testing a communication link for high speed service comprising the steps of:
    (a) coupling a test unit to the communication link;
    (b) establishing a call between the test unit and one or more Instances of customer premises equipment over the communication link;
    (c) terminating the call;
    (d) performing one or more on the communication link in response to terminating of the call within a time interval after termination of the call, wherein the time interval ends when a central office disconnects the call; and
    (e) determining whether the communication link can support high speed data transmission through employment of the one or more tests.

2. The method according to claim 1 further including the step of recording test data.

3. The method according to claim 2 wherein the step of recording includes the step of recording the loop length, line load impedance and the presence of loading coils.

4. The method according to claim 2 wherein the step of recording further includes the steps of:
    determining support for high speed service on the communication link, and
    determining an upstream rate for the communication link.

5. The method according to claim 4 wherein the upstream rate is symmetrical.

6. The method according to claim 4 wherein the upstream rate is asymmetrical.

7. The method according to claim 2 wherein the step of recording further includes the steps of:
    determining support for high speed service on the communication link, and
    determining a downstream rate for the communication link.

8. The method according to claim 7 wherein the downstream rate is symmetrical.

9. The method according to claim 7 wherein the downstream rate is asymmetrical.

10. The method according to claim 1 wherein the step of performing includes propagating electromagnetic energy waves from the test unit and the test unit receiving reflected electromagnetic energy waves.

11. The method according to claim 1 wherein the communication link includes a trunk.

12. The method according to claim 11 wherein the trunk is a digital line type.

13. The method according to claim 12 wherein the trunk is either a T-1 or primary rate interface trunk.

14. The method according to claim 11 wherein the trunk is a network.

15. The method according to claim 11 wherein the trunk is part of a network.

16. The method according to claim 11 wherein the trunk is a non-digital line type.

17. The method according to claim 16 wherein the trunk has a maximum length and a plurality of electrical parameters of the trunk.

18. The method according to claim 1 wherein the step of coupling the test unit includes connecting the test unit at a central office.

19. The method according to claim 1, wherein the step of coupling the test unit includes connecting the test unit at a testing facility.

20. The method according to claim 1 further including the step of determining if the communication link has echo canceling capabilities.

21. The method according to claim 20 further including the step of disabling the echo canceling capabilities.

22. The method according to claim 1, wherein the step of performing is performed before a central office disconnects the call.

23. The method according to claim 1, wherein the high speed service is asymmetrical digital subscriber line.

24. The method according claim 1, wherein the high speed service is asymmetrical digital subscriber line lite.

25. The method according to claim 1, wherein the high speed service is high bit rate digital subscriber line.

26. The method according to claim 1, wherein the high speed service is high bit rate digital subscriber line-2.

27. The method according to claim 1, wherein the high speed service is symmetric digital subscriber line.

28. The method according to claim 1, wherein the high speed service is a very high speed digital subscriber line service.

29. The method according to claim 1, wherein the high speed data service is an analog high speed service including television transmission.

30. The method according to claim 1, wherein the high speed data service is an analog high speed service including music transmission.

31. The method according to claim 1, wherein the high speed data service is an analog high speed service including voice transmission.

32. The method according to claim 1, wherein the high speed data service is an analog high speed service including multiplexed voice transmission.

33. The method according to claim 1, wherein the high speed data service is an analog high speed service including image transmission.

34. The method according to claim 1, wherein the high speed data service is an analog high speed service including video transmission.

35. The method according to claim 1, wherein the time interval in the step of testing is approximately 10 seconds.

* * * * *